US012677237B2

(12) United States Patent     (10) Patent No.:   US 12,677,237 B2

Manolakos et al.     (45) Date of Patent:    Jul. 7, 2026

(54) ANTENNA HOPPING FOR REFERENCE SIGNAL MEASUREMENTS IN USER EQUIPMENT (UE) POSITIONING

(71) Applicant: QUALCOMM Incorporated, San Diego, CA (US)

(72) Inventors: Alexandros Manolakos, Escondido, CA (US); Mukesh Kumar, Hyderabad (IN); Fnu Siddhant, Bangalore (IN); Pulkit Rajgadiya, Hyderabad (IN); Srinivas Yerramalli, San Diego, CA (US); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 531 days.

(21) Appl. No.: 18/263,116

(22) PCT Filed: Feb. 24, 2022

(86) PCT No.: PCT/US2022/070820

§ 371 (c)(1),
(2) Date: Jul. 26, 2023

(87) PCT Pub. No.: WO2022/221795

PCT Pub. Date: Oct. 20, 2022

(65) Prior Publication Data

US 2024/0107486 A1     Mar. 28, 2024

(30) Foreign Application Priority Data

Apr. 12, 2021   (GR) ............................... 20210100251

(51) Int. Cl.
| | |
|---|---|
| *H04W 64/00* | (2009.01) |
| *H04L 5/00* | (2006.01) |
| *H04W 24/10* | (2009.01) |

(52) U.S. Cl.
CPC ........... *H04W 64/00* (2013.01); *H04L 5/0051* (2013.01); *H04W 24/10* (2013.01)

(58) Field of Classification Search
CPC .... H04W 64/00; H04W 24/10; H04L 5/0051; G01S 5/0236; G01S 5/0036
See application file for complete search history.

(56) References Cited

U.S. PATENT DOCUMENTS

| | | | | |
|---|---|---|---|---|
| 9,651,653 | B2 * | 5/2017 | Fischer | ............... H04W 64/006 |
| 10,687,303 | B2 * | 6/2020 | Kurras | .................. G01S 5/0278 |

(Continued)

FOREIGN PATENT DOCUMENTS

| | | |
|---|---|---|
| KR | 20190095076 A | 8/2019 |
| WO | WO-2020206021 A1 | 10/2020 |
| WO | WO-2021026699 A1 | 2/2021 |

OTHER PUBLICATIONS

International Search Report and Written Opinion—PCT/US2022/070820—ISA/EPO—Jul. 21, 2022.

*Primary Examiner* — Kabir A Timory
(74) *Attorney, Agent, or Firm* — QUALCOMM Incorporated

(57) ABSTRACT

Antenna hopping techniques for Positioning Reference Signal (PRS) measurements in positioning of a user equipment (UE) include, for each of a plurality of successive measurement instances, taking a set of measurements of a respective set of PRS resources during the respective measurement instance using only one subset of a plurality of subsets of antennas of the UE, such that different subsets of the plurality of subsets of antennas of the UE are used for different measurement instances of the plurality of successive measurement instances. Each subset comprises one or more, but fewer than all, antennas of the UE. Techniques include sending one or more measurement reports from the UE to a location server. Each of the one or more measure- (Continued)

☒ X/4 PRS resource measurements across Rx0
☒ X/4 PRS resource measurements across Rx1
☒ X/4 PRS resource measurements across Rx2
☒ X/4 PRS resource measurements across Rx3 ment reports may comprise: information indicative of a respective set of measurements, and a timestamp corresponding to the respective measurement instance during which the respective set of measurements were taken.

30 Claims, 13 Drawing Sheets

(56) References Cited

U.S. PATENT DOCUMENTS

2022/0124458 A1* 4/2022 Bao ........................ H04W 72/20
2022/0159415 A1 5/2022 Khoryaev et al.

* cited by examiner

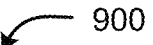

900

910

Executing a first measurement mode, wherein the first measurement mode comprises, for each measurement instance of a plurality of successive measurement instances taking a set of measurements of a respective set of PRS resources during the respective measurement instance using only one subset of a plurality of subsets of antennas of the UE, such that different subsets of the plurality of subsets of the antennas of the UE are used for different measurement instances of the plurality of successive measurement instances, wherein each subset of the plurality of subsets comprises one or more antennas but fewer than all antennas of the UE

920

Sending one or more measurement reports from the UE to a location server, wherein the each of the one or more measurement reports comprise:
- Information indicative of a respective set of measurements, and
- A timestamp corresponding to the respective measurement instance during which the respective set of measurements were taken

FIG. 9

ANTENNA HOPPING FOR REFERENCE SIGNAL MEASUREMENTS IN USER EQUIPMENT (UE) POSITIONING

RELATED APPLICATIONS

This application is a National Phase entry of International Application No. PCT/US22/70820, filed Feb. 24, 2022, entitled "ANTENNA HOPPING FOR REFERENCE SIGNAL MEASUREMENTS IN USER EQUIPMENT (UE) POSITIONING" which claims the benefit of Greek application No. 20210100251, filed Apr. 12, 2021, entitled "Antenna Hopping for Reference Signal Measurements in User Equipment (UE) Positioning", both of which are assigned to the assignee hereof, and incorporated herein in their entirety by reference.

BACKGROUND

1. Field of Invention

The present invention relates generally to the field of wireless communications and more specifically to determining the location of a User Equipment (UE) using radio frequency (RF) signals.

2. Description of Related Art

The determination of an position of a mobile UE in a wireless communication network, often referred to as "positioning" of the UE, may be performed using any of a variety of position-determining techniques. Many of these techniques may comprise, for example, transmission of reference signals by one or more Transmission Reception Points (TRPs) and/or other UEs of the wireless communication network, and the measurement of these reference signals by the UE. These measurements can be indicative of distances and/or angles between the UE and one or more TRPs and/or other UEs, enabling the position of the UE to be determined multiangulation, multilateration, and/or other geometrically-based techniques.

The position determination of a UE may often involve the UE taking multiple measurements of multiple reference signals using multiple antennas. While using multiple antennas can provide redundancy that can increase the accuracy of measurements made, it can also decrease the amount of reference signals the UE can measure in a single measurement instance, due to processing limitations of the UE. This can result in a delay of the UE's reporting of the measurements to a location server and ambiguity in a timestamp for the reporting period.

BRIEF SUMMARY

An example method of antenna hopping for Positioning Reference Signal (PRS) measurements in positioning of a user equipment (UE) in a wireless communication network, according to this disclosure, includes executing a first measurement mode, wherein the first measurement mode comprises, for each measurement instance of a plurality of successive measurement instances, taking a set of measurements of a respective set of PRS resources during the respective measurement instance using only one subset of a plurality of subsets of antennas of the UE, such that different subsets of the plurality of subsets of the antennas of the UE are used for different measurement instances of the plurality of successive measurement instances, wherein each subset of the plurality of subsets comprises one or more antennas but fewer than all antennas of the UE. The method further comprises sending one or more measurement reports from the UE to a location server, wherein each of the one or more measurement reports comprise: information indicative of a respective set of measurements, and a timestamp corresponding to the respective measurement instance during which the respective set of measurements were taken.

An example user equipment (UE) enabling antenna hopping for Positioning Reference Signal (PRS) measurements in positioning of the UE in a wireless communication network, according to this disclosure, comprises at least one transceiver, a plurality of antennas, a memory, and one or more processing units communicatively coupled with the transceiver, the plurality of antennas, and the memory. The one or more processing units are configured to execute a first measurement mode, wherein the first measurement mode comprises, for each measurement instance of a plurality of successive measurement instances, taking a set of measurements of a respective set of PRS resources during the respective measurement instance using only one subset of a plurality of subsets of the plurality of antennas of the UE, such that different subsets of the plurality of subsets of the plurality of antennas of the UE are used for different measurement instances of the plurality of successive measurement instances, wherein each subset of the plurality of subsets comprises one or more antennas of the plurality of antennas but fewer than all of the plurality of antennas of the UE. The one or more processing units are further configured to send one or more measurement reports from the UE to a location server, wherein each of the one or more measurement reports comprise: information indicative of a respective set of measurements, and a timestamp corresponding to the respective measurement instance during which the respective set of measurements were taken.

An example apparatus enabling antenna hopping for positioning reference signal (PRS) measurements in positioning of a user equipment (UE) in a wireless communication network, according to this disclosure, comprises means for executing a first measurement mode, where the first measurement mode may comprise, for each measurement instance of a plurality of successive measurement instances, taking a set of measurements of a respective set of PRS resources during the respective measurement instance using only one subset of a plurality of subsets of antennas of the UE, such that different subsets of the plurality of subsets of the antennas of the UE are used for different measurement instances of the plurality of successive measurement instances, where each subset of the plurality of subsets of the antennas may comprise one or more antennas but fewer than all antennas of the UE. The apparatus also comprises means for sending one or more measurement reports from the UE to a location server, where each of the one or more measurement reports may comprise information indicative of a respective set of measurements, and a timestamp corresponding to the respective measurement instance during which the respective set of measurements were taken.

An example non-transitory computer-readable medium, according to this disclosure, stores instructions for antenna hopping for positioning reference signal (PRS) measurements. The instructions comprising code for executing a first measurement mode, where the first measurement mode may comprise, for each measurement instance of a plurality of successive measurement instances, taking a set of measurements of a respective set of PRS resources during the respective measurement instance using only one subset of a plurality of subsets of antennas of a user equipment (UE), such that different subsets of the plurality of subsets of the antennas of the UE are used for different measurement instances of the plurality of successive measurement instances, where each subset of the plurality of subsets of the antennas may comprise one or more antennas but fewer than all antennas of the UE. The instructions further comprise code for sending one or more measurement reports from the UE to a location server, where each of the one or more measurement reports may comprise information indicative of a respective set of measurements, and a timestamp corresponding to the respective measurement instance during which the respective set of measurements were taken.

BRIEF DESCRIPTION OF THE DRAWINGS

FIG. 1 is a diagram of a positioning system, according to an embodiment.

FIG. 9 is a flow diagram of antenna hopping for PRS measurements in positioning of a UE in a wireless communication network, according to an embodiment.

Figure 2:
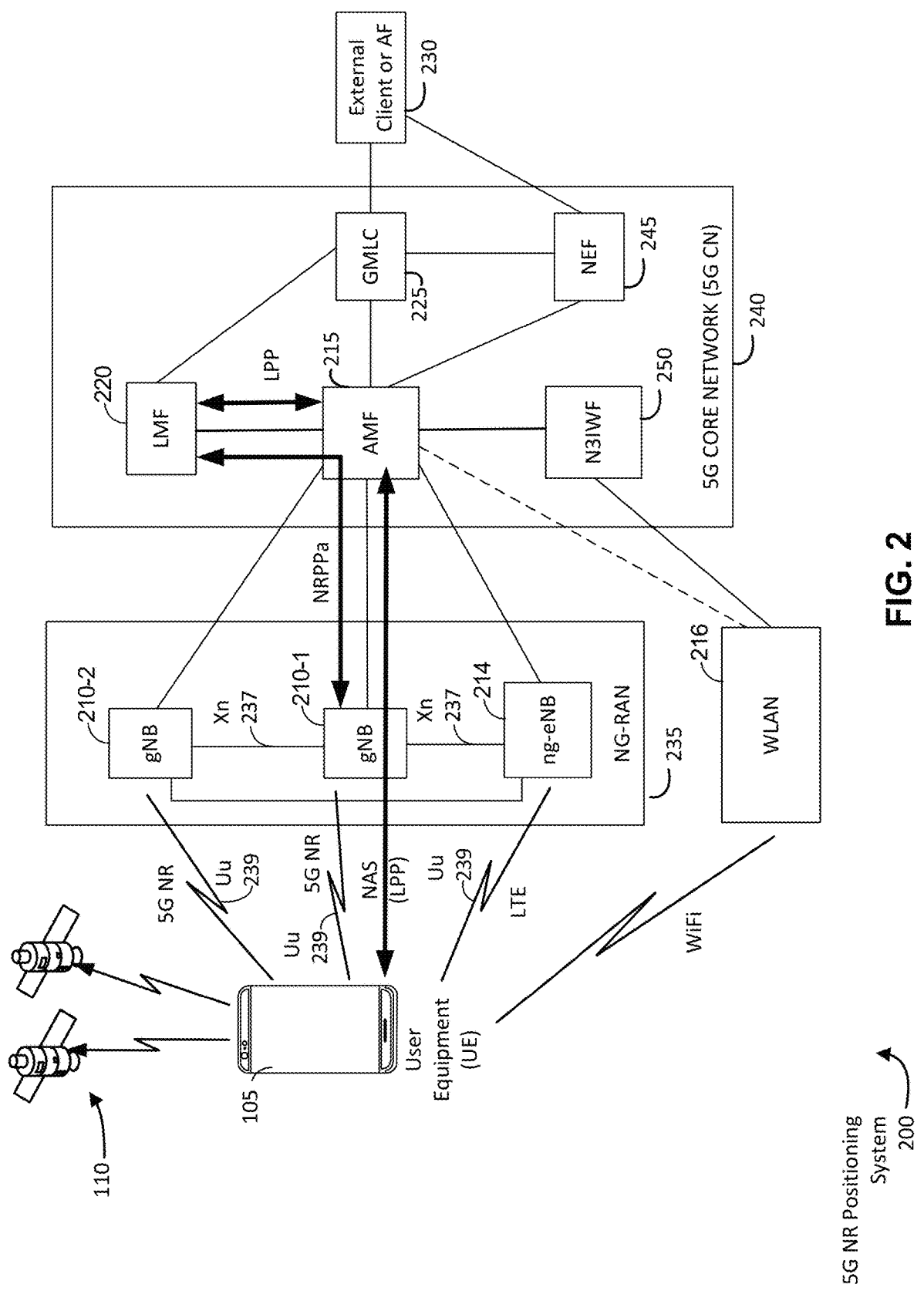
FIG. 2 is a diagram of a 5th Generation (5G) New Radio (NR) positioning system, illustrating an embodiment of a positioning system (e.g., the positioning system of FIG. 1) implemented within a 5G NR communication system.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing the innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Additionally, references to "reference signals," "positioning reference signals," "reference signals for positioning," and the like may be used to refer to signals used for positioning of a user equipment (UE). Accordingly, such reference signals may include one or more Positioning Reference Signal (PRS) resources, as defined in the relevant 3rd Generation Partnership Project (3GPP) wireless standards.

As previously noted, position determination of a UE may often involve the UE taking multiple measurements of multiple reference signals using multiple antennas. Because of processing limitations, the use of multiple antennas reduces the amount of reference signals the UE can measure during a single measurement instance. As shown in more detail herein, this can cause delays in reporting of the measurements and ambiguity with regard to the timestamp for the measurements. In situations in which the UE is moving, or where lower latency is desired, this can be problematic. Embodiments described herein provide for the use of a single antenna during at a time, allowing for more reference signals to be measured in a given measurement instance. This, in turn, can reduce the latency in measurement reporting, if desired. Techniques can further provide for antenna "hopping," where different antennas are used for different subsequent measurement instances, allowing for antenna diversity to help increase the overall quality of measurements. Additional details will follow, after an initial description of relevant systems and technologies.

Figure 1:
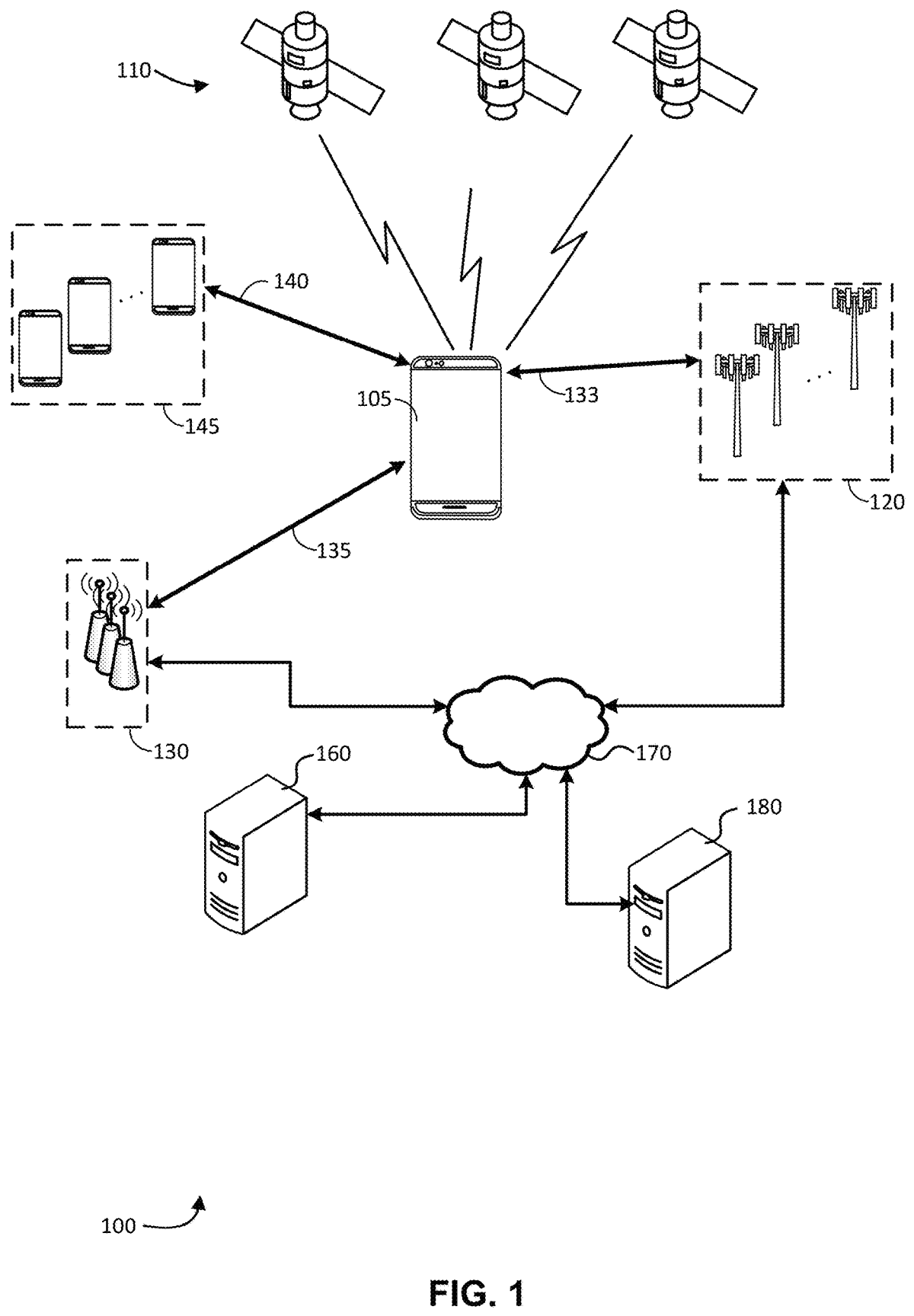

FIG. 1 is a simplified illustration of a positioning system 100 in which a UE 105, location server 160, and/or other components of the positioning system 100 can use the techniques provided herein for antenna hopping for reference signal measurements in UE positioning, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by 3GPP. Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LNIF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such as a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AOA), angle of departure (AOD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AOD, and/or ECID. The NRPPa protocol may be used to support positioning of UE 105 using network based position methods such as ECID, AOA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AOA, Receive Time-Transmission Time Difference (Rx-Tx), Differential AOA (DAOA), AOD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AOA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary.

For DL-based positioning, for example, these signals may comprise PRS (e.g., DL-PRS transmitted by base stations or SL-PRS transmitted by other UEs), which can be used for TDOA, AOD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AOD and/or AOA.

Figure 3:
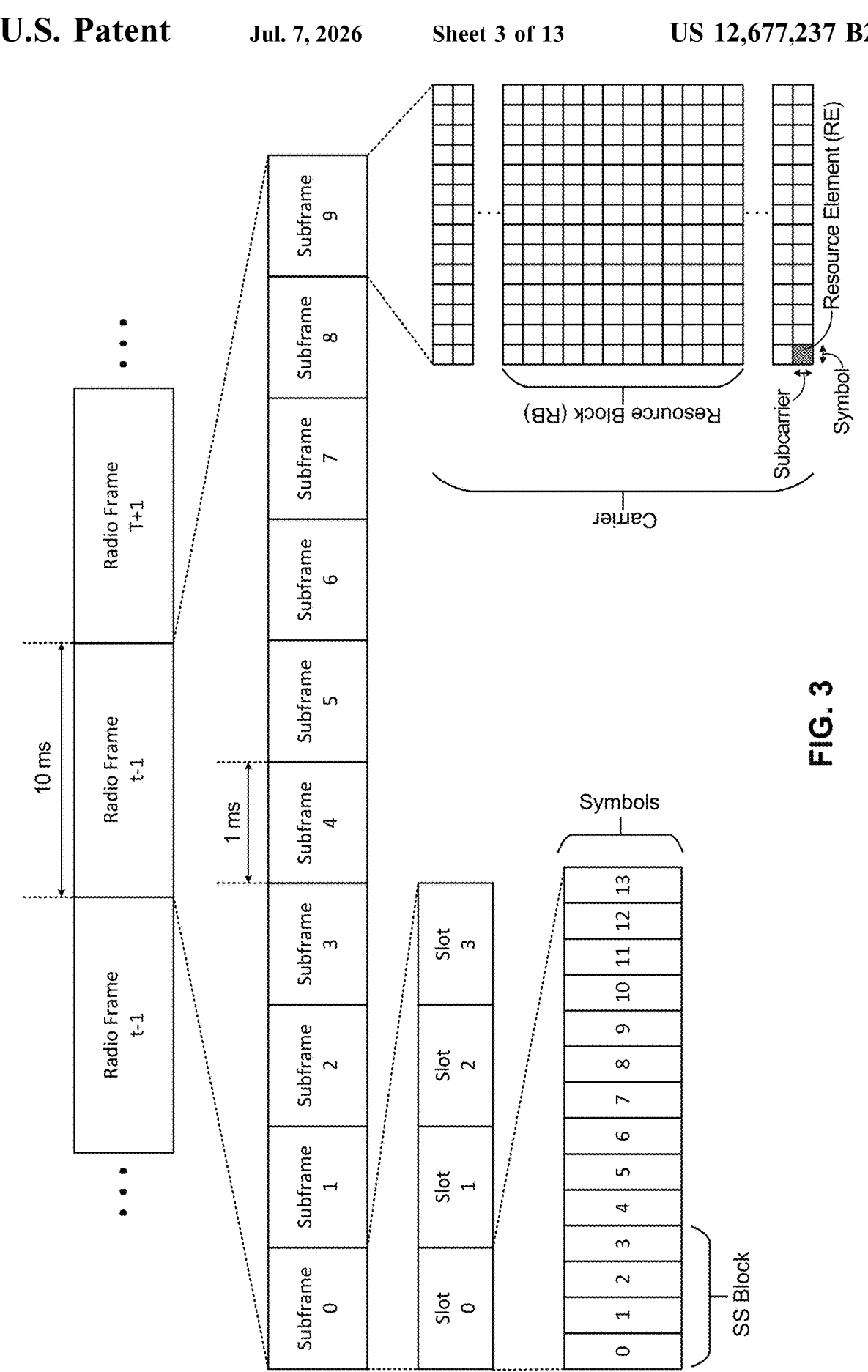
FIG. 3 is a diagram showing an example of a frame structure for NR and associated terminology.

FIG. 3 is a diagram showing an example of a frame structure for NR and associated terminology, which can serve as the basis for physical layer communication between the UE 105 and base stations, such as serving gNB 210-1. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 3 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 3. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

Figure 4:
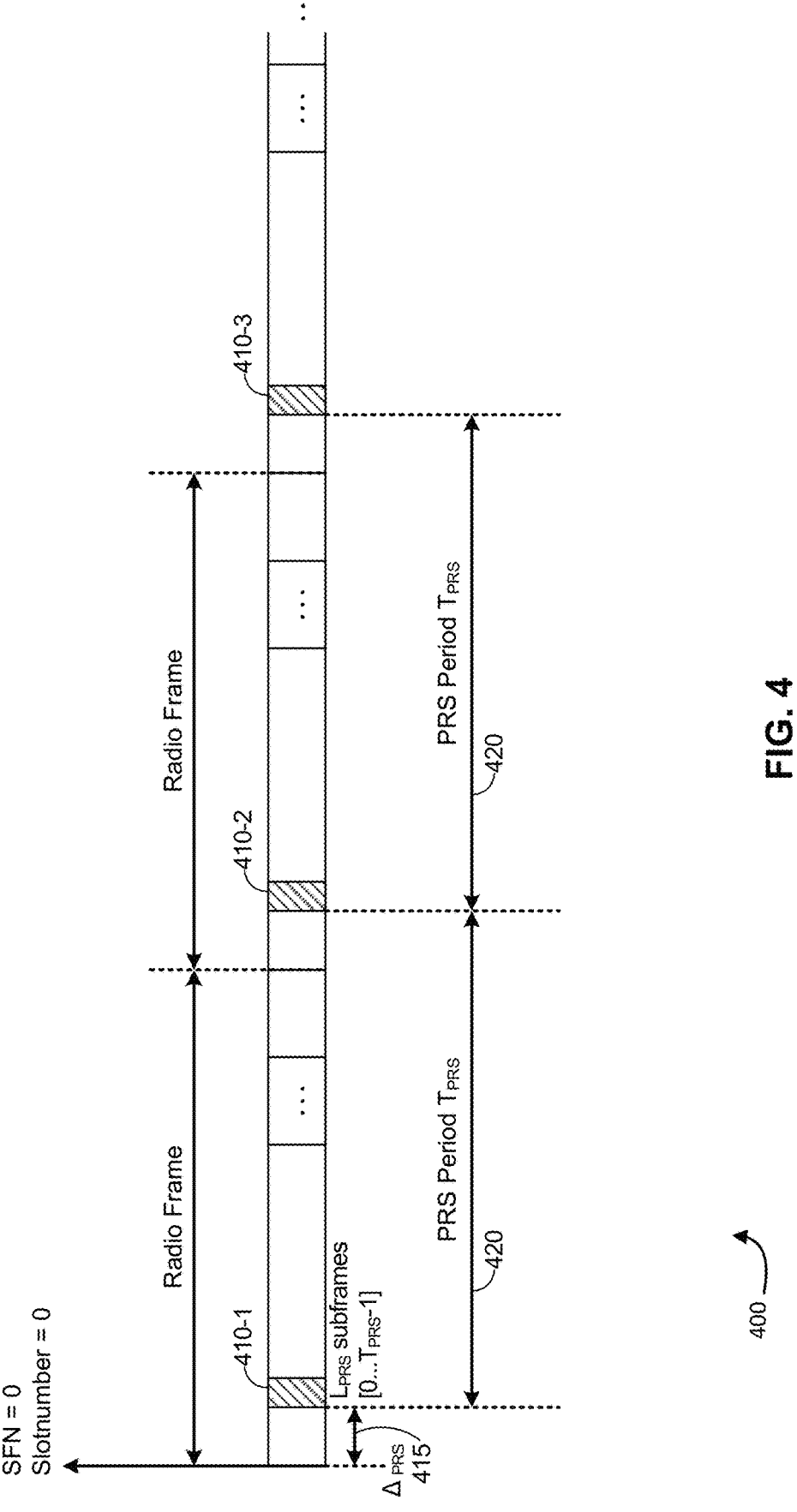
FIG. 4 is a diagram showing an example of a radio frame sequence with Positioning Reference Signal (PRS) positioning occasions.

FIG. 4 is a diagram showing an example of a radio frame sequence 400 with PRS positioning occasions. A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," or simply an "occasion" or "instance." Subframe sequence 400 may be applicable to broadcast of PRS signals (DL-PRS signals) from base stations 120 in positioning system 100. The radio frame sequence 400 may be used in 5G NR (e.g., in 5G NR positioning system 200) and/or in LTE. Similar to FIG. 3, time is represented horizontally (e.g., on an X axis) in FIG. 4, with time increasing from left to right. Frequency is represented vertically (e.g., on a Y axis) with frequency increasing (or decreasing) from bottom to top.

FIG. 4 shows how PRS positioning occasions 410-1, 410-2, and 410-3 (collectively and generically referred to herein as positioning occasions 410) are determined by a System Frame Number (SFN), a cell-specific subframe offset ($\Delta_{PRS}$) 415, a length or span of LPRs subframes, and the PRS periodicity ($T_{PRS}$) 420. The cell-specific PRS subframe configuration may be defined by a "PRS Configuration Index," $I_{PRS}$, included in assistance data (e.g., TDOA assistance data), which may be defined by governing 3GPP standards. The cell-specific subframe offset ($\Delta_{PRS}$) 415 may be defined in terms of the number of subframes transmitted starting from System Frame Number (SFN) 0 to the start of the first (subsequent) PRS positioning occasion.

A PRS may be transmitted by wireless nodes (e.g., base stations 120) after appropriate configuration (e.g., by an Operations and Maintenance (O&M) server). A PRS may be transmitted in special positioning subframes or slots that are grouped into positioning occasions 410. For example, a PRS positioning occasion 410-1 can comprise a number $N_{PRS}$ of consecutive positioning subframes where the number $N_{PRS}$ may be between 1 and 160 (e.g., may include the values 1, 2, 4 and 6 as well as other values). PRS occasions 410 may be grouped into one or more PRS occasion groups. As noted, PRS positioning occasions 410 may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). In some embodiments, $T_{PRS}$ may be measured in terms of the number of subframes between the start of consecutive positioning occasions.

In some embodiments, when a UE 105 receives a PRS configuration index $I_{PRS}$ in the assistance data for a particular cell (e.g., base station), the UE 105 may determine the PRS periodicity $T_{PRS}$ 420 and cell-specific subframe offset ($\Delta_{PRS}$) 415 using stored indexed data. The UE 105 may then determine the radio frame, subframe, and slot when a PRS is scheduled in the cell. The assistance data may be determined by, for example, a location server (e.g., location server 160 in FIG. 1 and/or LMF 220 in FIG. 2), and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset ($\Delta_{PRS}$) 415) relative to other cells in the network that use a different frequency. In SFN-synchronous networks all wireless nodes (e.g., base stations 120) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time. A UE 105 may determine the timing of the PRS occasions 410 of the reference and neighbor cells for TDOA positioning, if the UE 105 can obtain the cell timing (e.g., SFN or Frame Number) of at least one of the cells, e.g., the reference cell or a serving cell. The timing of the other cells may then be derived by the UE 105 based, for example, on the assumption that PRS occasions from different cells overlap.

Figure 5:
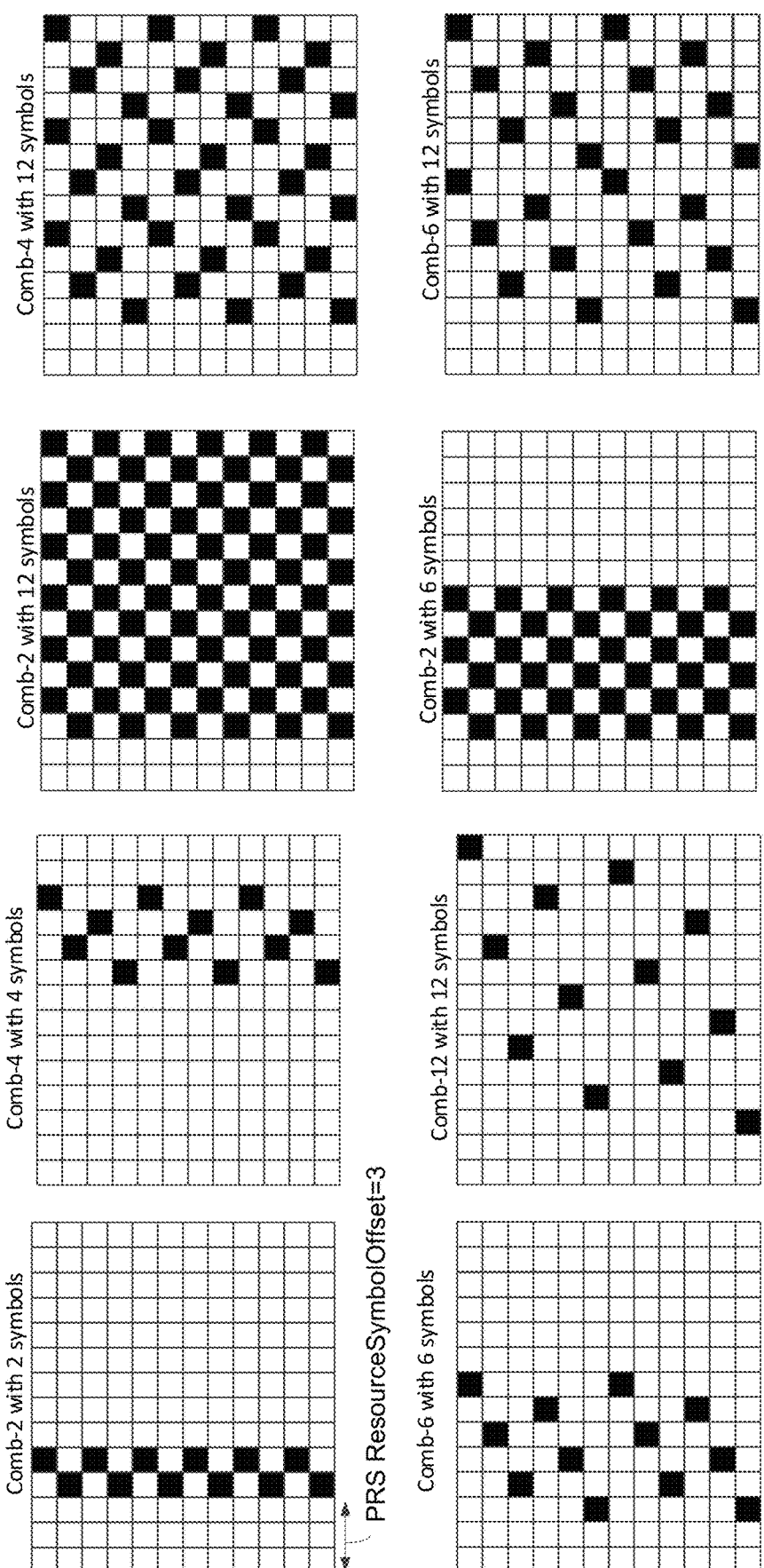
FIG. 5 is a diagram showing example comb structures that may be used for transmitting PRS resources.

With reference to the frame structure in FIG. 3, a collection of REs that are used for transmission of PRS is referred to as a "PRS resource." The collection of resource elements can span multiple RBs in the frequency domain and one or more consecutive symbols within a slot in the time domain, inside which pseudo-random Quadrature Phase Shift Keying (QPSK) sequences are transmitted from an antenna port of a TRP. In a given OFDM symbol in the time domain, a PRS resource occupies consecutive RBs in the frequency domain. The transmission of a PRS resource within a given RB has a particular comb size (also referred to as the "comb density"). A comb size "N" represents the subcarrier spacing (or frequency/tone spacing) within each symbol of a PRS resource configuration, where the configuration uses every Nth subcarrier of certain symbols of an RB. For example, for comb-4, for each of the four symbols of the PRS resource configuration, REs corresponding to every fourth subcarrier (e.g., subcarriers 0, 4, 8) are used to transmit PRS of the PRS resource. Comb sizes of comb-2, comb-4, comb-6, and comb-12, for example, may be used in PRS. Examples of different comb sizes using with different numbers of symbols are provided in FIG. 5.

A "PRS resource set" is a group of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). A "PRS resource repetition" is a repetition of a PRS resource during a PRS occasion/instance. The number of repetitions of a PRS resource may be defined by a "repetition factor" for the PRS resource. In addition, the PRS resources in a PRS resource set may have the same periodicity, a common muting pattern configuration, and the same repetition factor across slots. The periodicity may have a length selected from $2^m \cdot \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set may be associated with a single beam (and/or beam ID) transmitted from a single TRP (where a TRP may transmit one or more beams). That is, each PRS resource of a PRS resource set may be transmitted on a different beam, and as such, a PRS resource (or simply "resource") can also be referred to as a "beam." Note that this does not have any implications on whether the TRPs and the beams on which PRS are transmitted are known to the UE.

In the 5G NR positioning system 200 illustrated in FIG. 2, a TRP (e.g., 210, 214, 216) may transmit frames, or other physical layer signaling sequences, supporting PRS signals (i.e. a DL-PRS) according to frame configurations as previously described, which may be measured and used for position determination of the UE 105. As noted, other types of wireless network nodes, including other UEs, may also be configured to transmit PRS signals configured in a manner similar to (or the same as) that described above. Because transmission of a PRS by a wireless network node may be directed to all UEs within radio range, the wireless network node may be considered to transmit (or broadcast) a PRS.

For positioning in which a UE 105 takes measurements of DL-PRS and provides measurement data to a location server (e.g., UE-assisted DL and DL-UL types of positioning), the UE 105 provides the measurement data in measurement "reports" that include a timestamp and measurement quality of measurements taken, along with the measurement data itself. However, due to limited processing capabilities of the UE 105, the UE may need to take measurements over multiple measurement instances (e.g., multiple PRS instances) before being able to provide a measurement report with the diversity of PRS resource measurements for UE positioning. Additional details are provided with respect to FIG. 6.

Figure 6:
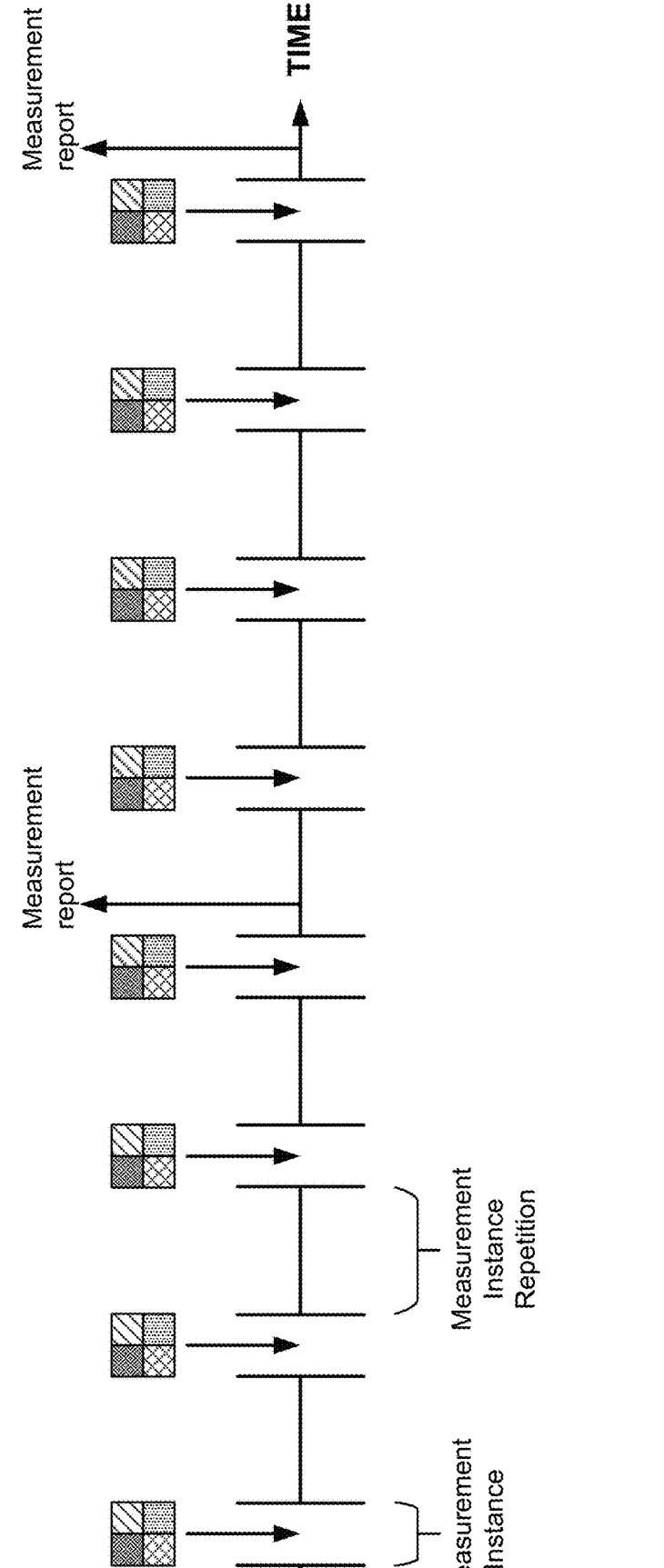
FIG. 6 is a graph of an example timeline illustrating a relationship, in time, of measurement instances and measurement reports according to a legacy measurement mode.

FIG. 6 is a graph of an example timeline illustrating a relationship, in time, of measurement instances and measurement reports. As discussed hereafter a measurement instance may refer to a time period during which measurements (of the same or different types) can be obtained from one or more PRS resources, which may include DL-PRS resources over a Uu interface and/or SL-PRS resources over an SL interface. Thus, measurement instances may correspond with PRS instances. Additionally or alternatively, they may occur with a different frequency (e.g., on a per-repetition or per-symbol basis, as discussed hereafter). Further, in the example illustrated in FIG. 7, the UE has four antennas (Rx0, Rx1, Rx2, and Rx3), represented by different shading. It will be understood, however, that different UEs may have different numbers of antennas, processing capabilities, and/or other features that may alter the relationship of measurement instances and measurement reports illustrated in FIG. 6.

FIG. 6 illustrates legacy UE behavior in which all antennas are used in each measurement instance. That is, when the UE measures a PRS resource transmitted during a measurement instance, it can sample the Channel Energy Response (CER) of the PRS resource using four antennas at the same time, resulting in four measurements of the PRS resource (e.g., four ToA measurements).

The processing capabilities of the UE may limit number of measurements made during each measurement instance. For example, the UE may be capable of processing X CERs for any given measurement instance. Because the UE uses four antennas at the same time, the number of resource measurements for each antenna, then, is limited to X/4. Although this redundancy in measurements across multiple antennas can increase the quality of the measurements when combined and processed in baseband, the use of four antennas at the same time effectively reduces the number of PRS resources the UE is capable of measuring in a given measurement instance. For example, if the value of X is 16 for a particular UE, the UE may be limited to measuring four PRS resources per measurement instance.

This limitation can reduce the frequency with which measurement reports are provided by the UE. For example, a location server may configure a UE to take measurements of 16 PRS resources (e.g., from various different TRPs and/or other UEs) to allow for sufficient signal diversity to help ensure accurate positioning of the UE. If the UE is limited to four PRS resources per measurement instance, it may then only provide a measurement report every four measurement instances (e.g., after 16 PRS resources have been measured), as shown in FIG. 6. As noted, this lower-latency measurement reporting may be acceptable in certain circumstances, particularly if the UE is immobile. However, if the UE is moving, this latency in reporting can introduce ambiguities/errors. In particular, because each measurement report may provide only a single timestamp (referred to as "nr-TimeStamp-16" in current 3GPP specifications), this can lead to ambiguity in cases where measurements were taken at different times (e.g., different measurement instances) and at different locations.

To address these and other issues, embodiments provide for antenna hopping when taking measurements, using one antenna (or one subset of antennas) for each measurement instance, and cycling through multiple antennas (or subsets) across multiple measurement instances. An example of this is illustrated in FIG. 7.

Figure 7:
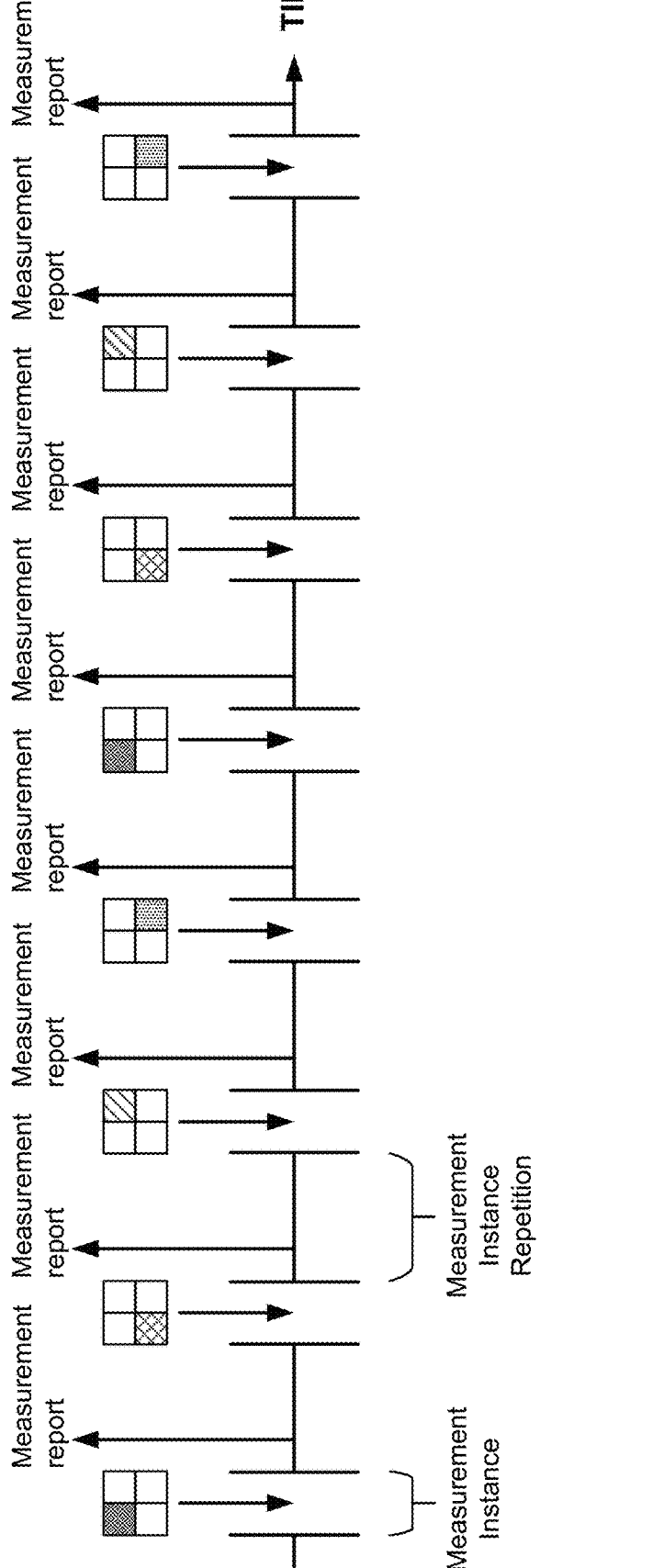
FIGS. 7-8 is a graph of an example timeline with measurement instances and measurement reports according to antenna hopping measurement modes, according to some embodiments.

FIG. 7 is a graph of an example timeline of measurement instances and measurement reports similar to FIG. 6. In this example, however, the UE is able to make measurements of four times the PRS resources because it uses only one antenna to make measurements per measurement instance. For example, if the maximum number of measurements the UE can process for a given measurement instance, X, is 16, the UE is capable of measuring up to 16 different PRS resources per measurement instance. (Each antenna may therefor make fewer than X measurements per measurement instance, if so desired.) As illustrated, measurements may be made in a "round-robin" fashion, where the UE cycles through antennas, moving from one antenna to the next in a predetermined order (e.g., from Rx0 to Rx1 to Rx2 to Rx3, then repeating) at every measurement instance.

This concept can be extended to subsets of UE antennas, where different subsets of antennas are used for each measurement instance. Here, a "subset" may comprise any subset of one or more UE antennas, but fewer than all UE antennas. Thus, different subsets may comprise different combinations of UE antennas. With regard to the maximum number of measurements per measurement instance, X, the number of PRS resources measured per measurement instance would then be X/N, where N is the number of antennas in a particular subset. Different subsets may have different numbers of antennas. If, for example, a subset has two antennas and X is 16, the subset may be capable of taking measurements of eight PRS resources in a given measurement instance.

Because this results in measurements of more resources per measurement instance then the method illustrated in FIG. 6, the UE may be capable of providing measurement reports more frequently. For example, if X is 16 and each measurement report requires measurements of 16 PRS resources, the UE can provide a measurement report after each measurement instance, as shown in FIG. 7. This can help alleviate timestamp ambiguities noted previously, because the timestamp of each measurement report may correspond to a single measurement instance (rather than multiple measurement instances). That said, depending on desired functionality, one measurement report may be provided after multiple measurement instances in a manner similar to FIG. 6. Although there may be a reduction in measurement quality due to the fact that only a single antenna per PRS resource is used, the functionality illustrated in FIG. 7 can be particularly useful in mobility situations or other situations where relatively low-latency measurement reporting is desired to increase the speed/frequency of position determinations of the UE.

Figure 8:
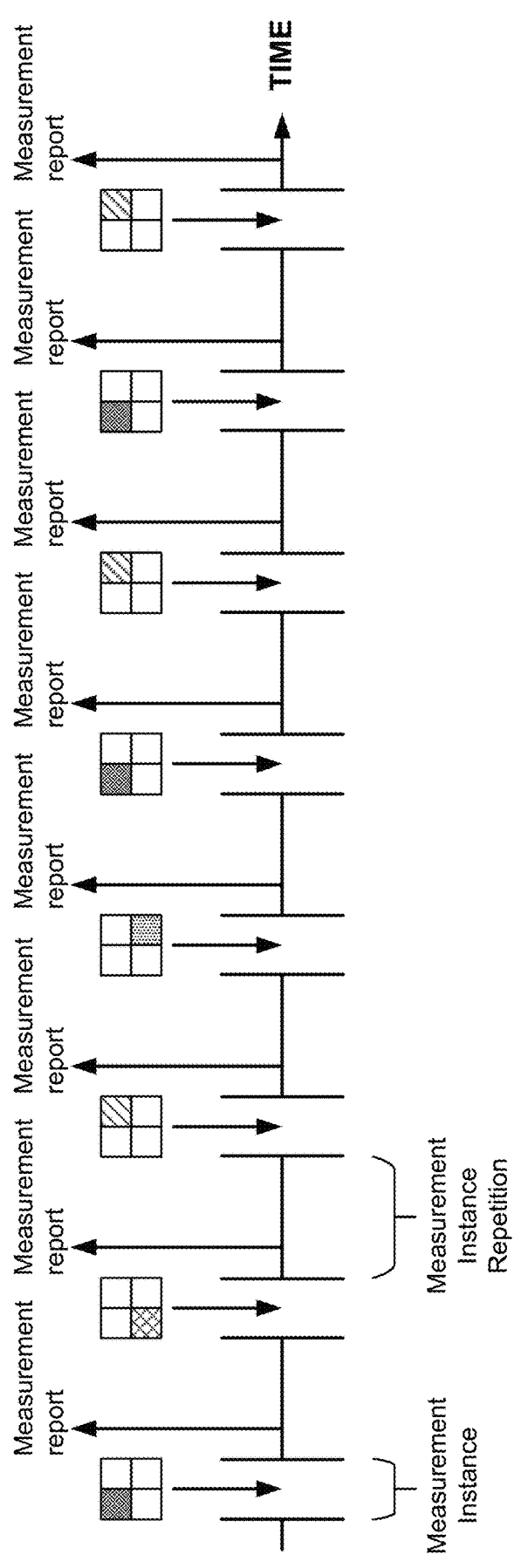

FIG. 8 is a graph of an example timeline illustrating a variation in the embodiment illustrated in FIG. 7, illustrating how the antenna(s) having the best measurement results may be identified and reused while antenna hopping. In this example, after cycling through all four antennas in the first four measurement instances, the UE then cycles through the two "best" antennas, Rx0 and Rx2, for the next four measurement instances. Again, this concept can be extended to subsets of the UE antennas one or more antennas (but fewer than all of the UE antennas).

It can be noted that, depending on the circumstances, any group of one or more antennas may be identified to include in (or exclude from) antenna hopping. For example, initial measurements from each antenna (e.g., after the first four measurement instances in FIG. 8) can indicate which antennas or subsets produce the best Tx-Rx values, Signal-to-Noise Ratio (SNR), RSRP, or measurement consistency. The selection of the subgroup of antennas to use in subsequent measurement instances can be based on one or more of these factors. For example, the two antennas/subsets having the best SNR value may be selected, all antennas/subsets having at least a threshold measurement consistency may be selected, antennas/subsets for which Tx-Rx values fail to meet a minimum threshold are omitted, etc. According to some embodiments, after a certain amount of time, measurements again may be taken by all antennas/subsets to determine how factors (SNR, RSRP, etc.) may have changed, and to select a new subgroup of antennas/subsets (which can be the same or different subgroup as the previous subgroup) for subsequent antenna hopping.

The selection of a subgroup of antennas/subsets to use while operating in an antenna hopping measurement mode can exclude the use of antennas/subsets that are blocked and/or being used by other processes. According to some embodiments, for example, a UE may engage in antenna hopping using only three of its four antennas/subsets in cases where one of the antennas/subsets is being used during one or more measurement instances. Additionally or alternatively, if an antenna/subset is being used or is blocked during a particular measurement instance, the UE can use another antenna/subset (e.g., cycling to the next antenna/subset in a round-robin scheme) for that measurement instance, thereby adapting to antenna/subset schedule conflicts on the fly.

According to some embodiments, a UE may be capable of switching between modes of operation as needed. For example, a UE may be capable of switching from a legacy measurement mode (e.g., FIG. 6, using all antennas per measurement instance) to an antenna hopping measurement mode (e.g., in the manner shown in FIG. 7 or 8) dynamically, based on one or more of a variety of factors. These factors may include, for example, a low latency requirement for the measurement reporting and/or positioning of the UE, a speed of the UE exceeding a predetermined threshold, whether one or more antennas of the UE are blocked, whether one or more of the antennas are being used for other operations or other technologies, or the like.

Depending on desired functionality, the granularity with which the UE may be able to switch between measurement modes may vary. For example, according to some embodiments, the UE may be capable of switching modes between measurement reports and/or between PRS occurrences/instances. Additionally or alternatively, embodiments may be capable of switching modes between PRS repetitions within a single PRS occurrence/instance, and/or between symbols within a single PRS repetition. As an example of repetition-level switching, for a PRS resource that has two repetitions spanning two slots, the UE use for antennas for the first repetition/slot. The UE can then determine which is the best antenna/subset (e.g., based on SNR, measurement consistency, etc.) and then use that single antenna/subset in the second repetition. As an example of symbol-level switching, for a PRS resource with 12 symbols, the UE use four antennas/subset for the first two symbols, determine which is the best antenna/subset based on measurements made in the first two symbols, then use that single antenna/subset to take measurements during the remaining 10 symbols. Alternatively, the UE may use four antennas/subset simultaneously in a legacy measurement mode for the first two symbols (in a legacy measurement mode), then switch to an antenna hopping measurement mode, measuring the last 10 symbols by cycling through the antennas/subset, one antenna/subset at a time.

Additionally or alternatively, switching may be at least partly based on a location of one or more antennas/subsets. This can be particularly applicable to UEs with antennas distributed in various locations, such as a vehicular UE with antennas in front, back, and sides of the vehicle. Which antennas/subsets to use and whether to switch between legacy and antenna hopping measurement modes may depend on the relative location of the antennas with each other. For example, if a vehicle senses that an obstacle is obstructing the right front side of the car (e.g., using cameras, radar, sonar, and/or other sensors), the UE can switch to using antennas/subsets located in the back and left sides. Further, if a vehicle determines that a collision is imminent with the cars in front (using sensors and/or other applicable information), it may determine to make fast (low-latency) and precise measurements of vehicles to track changes in distance. Accordingly, the vehicle may switch from a legacy measurement mode to an antenna-hopping measurement mode to measure more PRS resources with an antenna in the front of the car. Similarly, if the vehicle is in a "platooning" mode (in which it is part of a caravan of vehicles), the vehicle may take measurements to determine distances of cars in front and in back of the vehicle more frequently than measurements to determine distances to cars to its left and right sides. Thus, the vehicular UE may use antennas/subsets in front and back of the vehicle rather than (or more frequently than) antennas/subsets on the left-hand and right-hand sides. Ultimately, a location of one or more antennas/subsets of the UE may impact whether a UE switches between legacy and antenna-hopping measurement modes, and/or which antennas/subsets the UE uses in an antenna-hopping measurement mode. Additional details regarding how switching between antennas may be performed are provided hereafter with regard to FIGS. 12 and 13.

Figure 10:
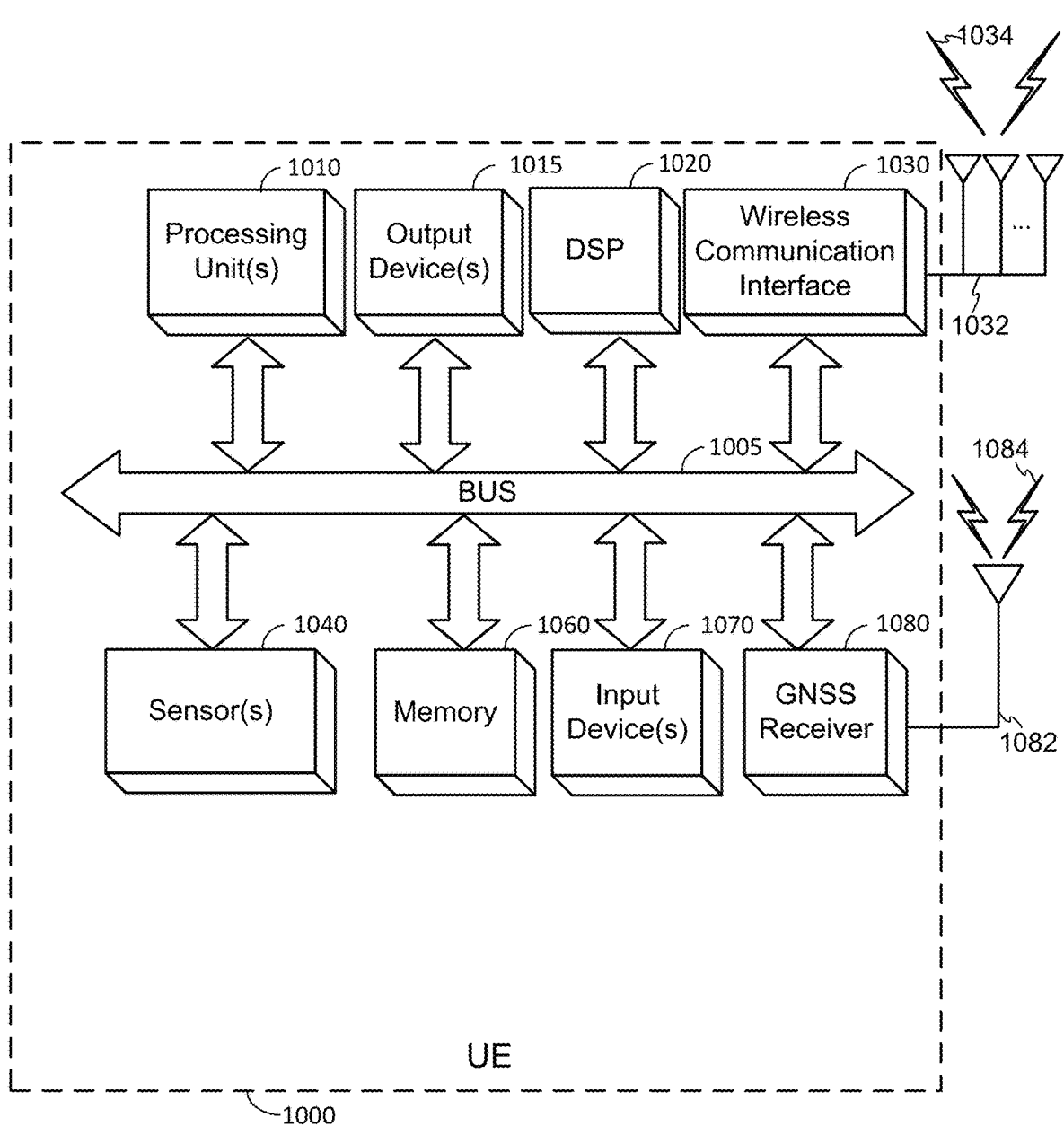
FIG. 10 is a block diagram of an embodiment of a UE, which can be utilized in embodiments as described herein.

FIG. 9 is a flow diagram of a method 900 of antenna hopping for PRS measurements in positioning of a UE in a wireless communication network, according to an embodiment. Means for performing the functionality illustrated in one or more of the blocks shown in FIG. 9 may be performed by hardware and/or software components of a UE. Example components of a UE are illustrated in FIG. 10, which is described in more detail below. Here, because a subset comprises one or more antennas (but fewer than all antennas of the UE), the term "subset" may be understood as applying to a single antenna in embodiments in which each subset comprises a single antenna.

At block 910, the functionality comprises executing a first measurement mode, where the first measurement mode comprises, for each measurement instance of a plurality of successive measurement instances, taking a set of measurements of a respective set of PRS resources during the respective measurement instance using only one subset of a plurality of subsets of antennas of the UE, such that different subsets of the plurality of subsets of antennas of the UE are used for different measurement instances of the plurality of successive measurement instances. Each subset of the plurality of subsets comprises one or more antennas but fewer than all antennas of the UE. Here, the first measurement mode may comprise an antenna hopping measurement mode in which the UE cycles through different sets at different successive measurement instances. As illustrated in FIGS. 7 and 8, cycling through two or more of the plurality of subsets of UE antennas may comprise cycling through different subsets of the plurality of subsets for different measurement instances of the plurality of successive measurement instances in a round-robin fashion. Again, measurement instances may vary, depending on the desired granularity for measurements. According to some embodiments, therefore, each measurement instance of the plurality of successive measurement instances may correspond to a respective PRS instance, PRS instance repetition, or symbol of PRS instance repetition. Further, PRS resources may be transmitted by TRPs and/or other UEs. Thus, according to some embodiments, the set of PRS resources comprise downlink PRS (DL-PRS) resources, sidelink PRS (SL-PRS) resources, or both.

As noted, some embodiments may further comprise adapting subset use (i.e., using a subgroup of subsets through which the UE cycles during antenna hopping) in response to one or more different factors. The culling of subsets (selection of the subgroup of antennas) in this manner may be done after an initial rotation through all subsets, or a larger group of subsets. Thus, some embodiments may further comprise using a first group of subsets to take the respective sets of measurements during a first set of the plurality of successive measurement instances. Such embodiments may further comprise using a second group of subsets to take the respective sets of measurements during a second set of the plurality of successive measurement instances, wherein the second group is a subgroup of the first group. Such embodiments may further comprise determining the second group based on measurement values of at least a portion of the respective sets of measurements taken using the first group during a first set of the plurality of successive measurement instances. Moreover, according to some embodiments, determining the second group may be based on measurement values comprises determining the second set group based on an Rx-Tx value, an SNR, an RSRP value, or a consistency of the measurement values, or a combination thereof.

Means for performing functionality at block 910 may comprise a bus 1005, processing unit(s) 1010, digital signal processor (DSP) 1020, wireless communication interface 1030, memory 1060, and/or other components of a UE, as illustrated in FIG. 10 and described below.

At block 920, the functionality comprises sending one or more measurement reports from the UE to a location server, wherein each of the one or more measurement reports comprise information indicative of a respective set of measurements, and a timestamp corresponding to the respective measurement instance during which the respective set of measurements were taken. As illustrated in FIG. 2 and described previously, a location server may comprise an LMF 220, which may be located in a 5G CN 240. Additionally or alternatively, a location server may be implemented, at least in part, at the NG-RAN, for example at a gNB 210. The measurement report, therefore, can be provided using a suitable protocol for such communications, such as LPP. Again, sending the one or more measurement reports may comprise sending them with more frequency than in a legacy measurement mode (e.g., FIG. 6). In particular, sending the one or more measurement reports may comprise sending a measurement report after each measurement instance. That said, some embodiments may send measurement reports after two or more measurement instances. As previously noted, measurement reports may include timestamps for each measurement instance, indicating when measurements for the measurement instance took place.

Means for performing functionality at block 920 may comprise a bus 1005, processing unit(s) 1010, DSP 1020, wireless communication interface 1030, memory 1060, and/or other components of a UE, as illustrated in FIG. 10 and described below.

As previously discussed, some embodiments may include additional functions for switching between measurement modes. For example, some embodiments of the method 900 may further comprise switching to the first measurement mode from a second measurement mode in which all antennas of the UE are used to take measurements in each measurement instance of another plurality of successive measurement instances. According to some embodiments, the switching to the first measurement mode from a second measurement mode is based on an applicable reporting latency for the one or more measurement reports, a speed of the UE, a location of one or more of the antennas of the UE, whether one or more antennas of the UE are blocked, or an availability of one or more antennas of the UE during the plurality of successive measurement instances, or a combination thereof.

FIG. 10 illustrates an embodiment of a UE 1000, which can be utilized as described herein above (e.g., in association with FIGS. 1-9). For example, the UE 1000 may correspond with UE 105 as described herein can perform one or more of the functions of the method shown in FIG. 9. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices (e.g., connected via wires and/or via a personal area network (PAN)). Furthermore, as previously noted, the functionality of the UE discussed in the previously described embodiments may be executed by one or more of the hardware and/or software components illustrated in FIG. 10.

The UE 1000 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as DSP chips, graphics acceleration processors, application specific integrated circuits (ASICs), and/or the like), and/or other processing structures or means. As shown in FIG. 10, some embodiments may have a separate DSP 1020, depending on desired functionality. Location determination and/or other determinations based on wireless communication may be provided in the processing unit(s) 1010 and/or wireless communication interface 1030 (discussed below). The UE 1000 also can include one or more input devices 1070, which can include without limitation one or more keyboards, touch screens, touch pads, microphones, buttons, dials, switches, and/or the like; and one or more output devices 1015, which can include without limitation one or more displays (e.g., touch screens), light emitting diodes (LEDs), speakers, and/or the like.

The UE 1000 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1000 to communicate with other devices as described in the embodiments above. The wireless communication interface 1030 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1032 that send and/or receive wireless signals 1034. As noted herein, many UEs may comprise for antennas 1032 or more, although the number of UEs may vary for different types of UEs. According to some embodiments, the wireless communication antenna(s) 1032 may comprise a plurality of discrete antennas, antenna arrays, or any combination thereof. The antenna(s) 1032 may be capable of transmitting and receiving wireless signals using beams (e.g., Tx beams and Rx beams). Beam formation may be performed using digital and/or analog beam formation techniques, with respective digital and/or analog circuitry. The wireless communication interface 1030 may include such circuitry.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1000 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1000 can further include sensor(s) 1040. Sensor(s) 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1000 may also include a Global Navigation Satellite System (GNSS) receiver 1080 capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver 1080 can extract a position of the UE 1000, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1080 is illustrated in FIG. 10 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1010, DSP 1020, and/or a processing unit within the wireless communication interface 1030 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1010 or DSP 1020.

The UE 1000 may further include and/or be in communication with a memory 1060. The memory 1060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the UE 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the UE 1000 (and/or processing unit(s) 1010 or DSP 1020 within UE 1000). In some embodiments, then, such code and/or instructions can be used to configure and/or adapt a general-purpose computer (or other device) to perform one or more operations in accordance with the described methods.

Figure 11:
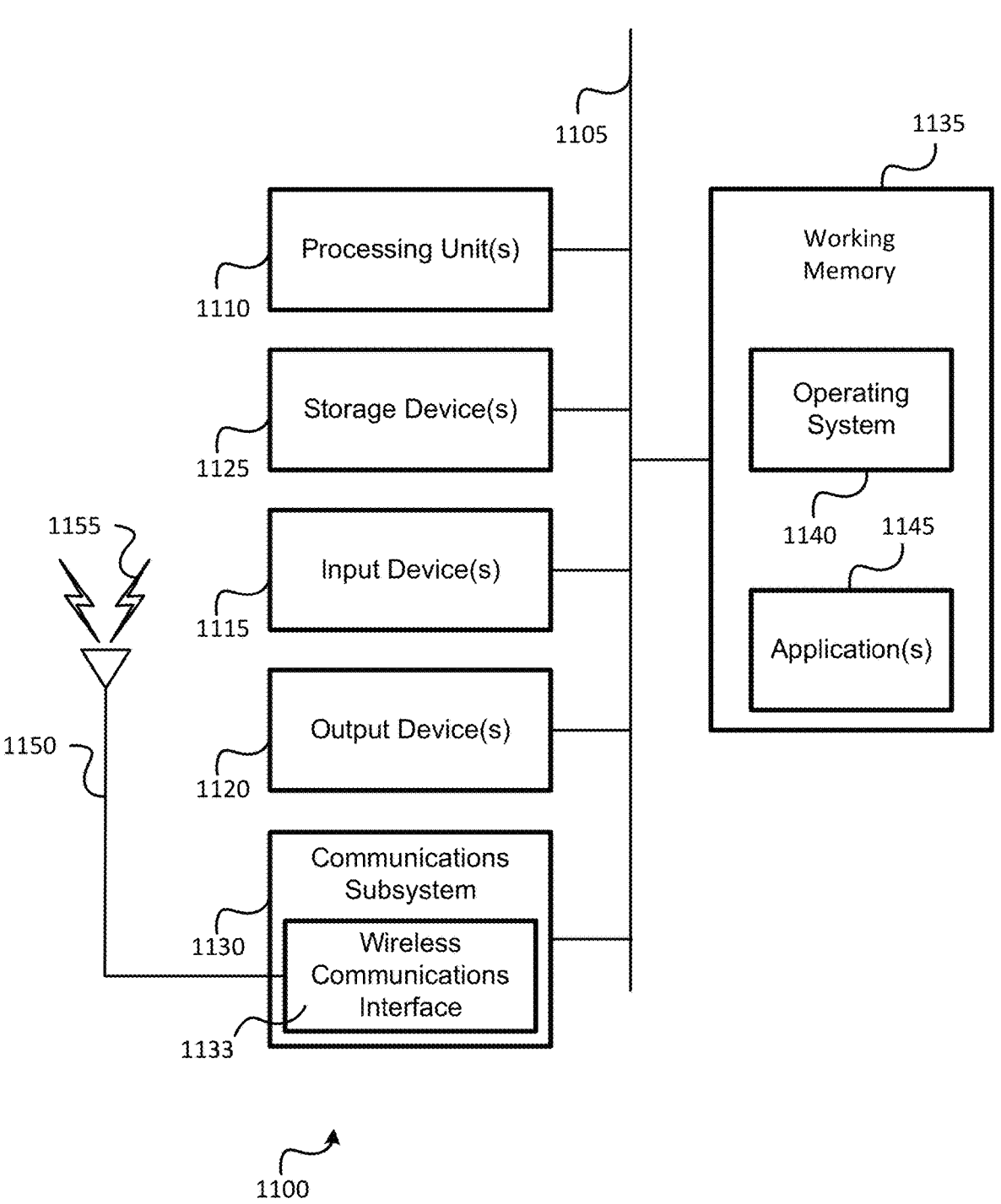
FIG. 11 is a block diagram of an embodiment of a computer system, which can be utilized in embodiments as described herein.

FIG. 11 is a block diagram of an embodiment of a computer system 1100, which may be used, in whole or in part, to provide the functions of one or more network components as described in the embodiments herein (e.g., location server 160 of FIG. 1, LMF of FIG. 2, etc.). It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner. In addition, it can be noted that components illustrated by FIG. 11 can be localized to a single device and/or distributed among various networked devices, which may be disposed at different geographical locations.

The computer system 1100 is shown comprising hardware elements that can be electrically coupled via a bus 1105 (or may otherwise be in communication, as appropriate). The hardware elements may include processing unit(s) 1110, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1100 also may comprise one or more input devices 1115, which may comprise without limitation a mouse, a keyboard, a camera, a microphone, and/or the like; and one or more output devices 1120, which may comprise without limitation a display device, a printer, and/or the like.

The computer system 1100 may further include (and/or be in communication with) one or more non-transitory storage devices 1125, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1100 may also include a communications subsystem 1130, which may comprise wireless communication technologies managed and controlled by a wireless communication interface 1133, as well as wired technologies (such as Ethernet, coaxial communications, universal serial bus (USB), and the like). The wireless communication interface 1133 may comprise one or more wireless transceivers may send and receive wireless signals 1155 (e.g., signals according to 5G NR or LTE) via wireless antenna(s) 1150. Thus the communications subsystem 1130 may comprise a modem, a network card (wireless or wired), an infrared communication device, a wireless communication device, and/or a chipset, and/or the like, which may enable the computer system 1100 to communicate on any or all of the communication networks described herein to any device on the respective network, including a User Equipment (UE), base stations and/or other TRPs, and/or any other electronic devices described herein. Hence, the communications subsystem 1130 may be used to receive and send data as described in the embodiments herein.

In many embodiments, the computer system 1100 will further comprise a working memory 1135, which may comprise a RAM or ROM device, as described above. Software elements, shown as being located within the working memory 1135, may comprise an operating system 1140, device drivers, executable libraries, and/or other code, such as one or more applications 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions execut-able by a computer (and/or a processing unit within a computer); in some embodiments, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

Figure 12:
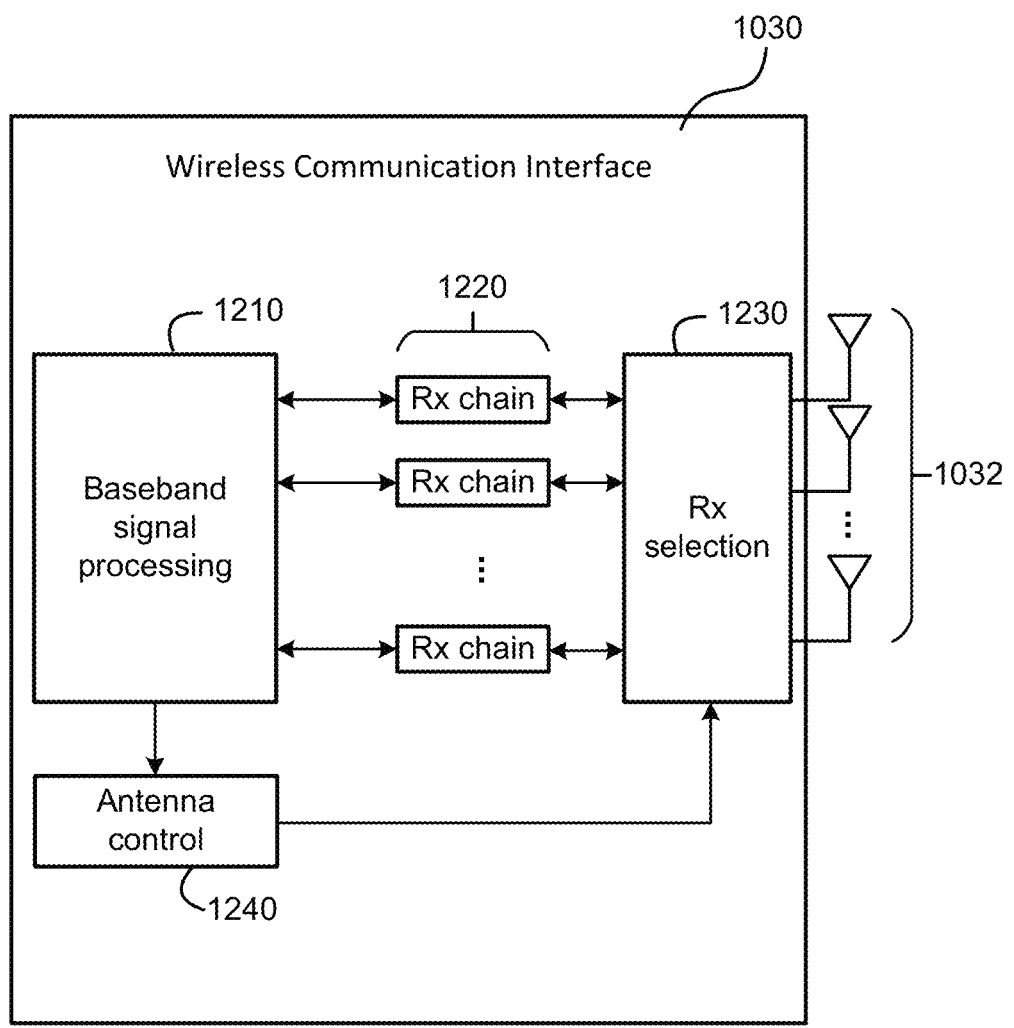
FIG. 12 and FIG. 13 are block diagram illustrating configurations of components of a wireless communication, according to some embodiments.

FIG. 12 is a block diagram illustrating a first configuration of components of a wireless communication interface 1030 of a UE, according to an embodiment, provided to illustrate how antenna selection as described herein may be implemented. It will be noted, however, that the wireless communication interface may include additional components that are not illustrated. (Components used to transmit signals and/or interface with other components within the UE, for example, are not illustrated.) The wireless communication interface 1030 and antennas 1032 may correspond with similar components illustrated in FIG. 10 and previously described. As a person of ordinary skill in the art will appreciate, the various components illustrated in FIG. 12 may be implemented via hardware and/or software, which may include analog circuitry, a DSP or other processor, and/or other components.

In this example, in addition to the antennas 1032, the wireless communication interface 1030 comprises a baseband signal processing block 1210, Rx chains 1220, Rx selection block 1230, and antenna control block 1240. In brief, the baseband signal processing block 1210 can operate the antenna control block 1240 to determine which antennas 1032 to activate by essentially passing the signal from the antennas 1032 to the Rx chains 1220. Thus, antennas 1032 effectively can be activated and deactivated using Rx selection block 1230. The signals from the antennas 1032 that get passed to the Rx chains 1220 are then processed by the Rx chains and provided to the baseband signal processing block 1210 for baseband processing. Depending on desired functionality, different Rx chains may correspond to different technologies (e.g., NR, WLAN, Bluetooth, etc.), and thus the antenna control block 1240 and Rx selection 1230 may route antenna signals to the proper Rx chain 1220 accordingly to an antenna schedule for the respective antennas. According to some embodiments, an antenna scheduler may be implemented by the baseband signal processing block 1210 and/or antenna control block 1240.

The processing limitations described herein with regard to the UE's capability to process reference signals in a given measurement instance may arise from limitations in the Rx chains 1220. For example, an Rx chain 1220 may be connected with multiple antennas (via the Rx selection block 1230), but capable of processing signal information from one antenna at a time. In such instances, the Rx selection block 1230 can be used to activate and deactivate antennas 1032 as described herein to help ensure processing capabilities are not exceeded.

Figure 13:
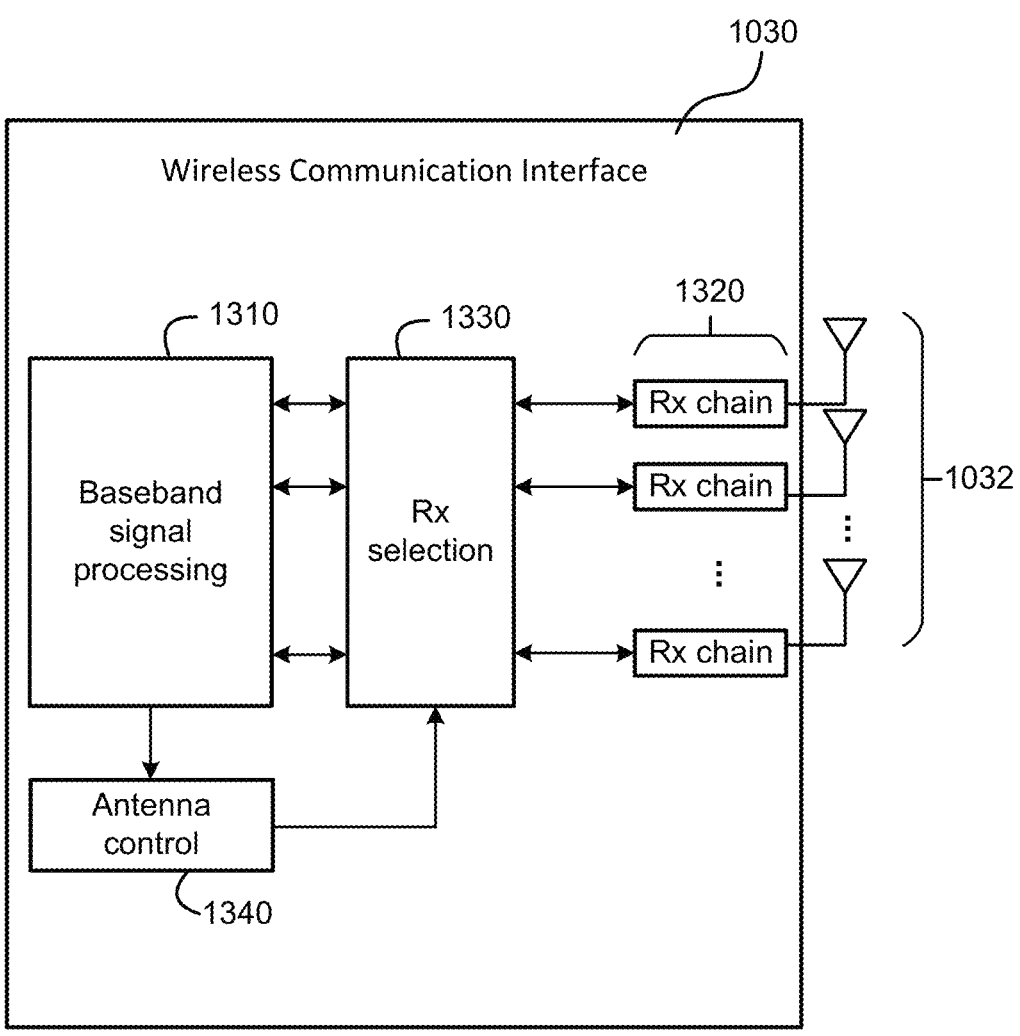

FIG. 13 is a block diagram illustrating a second configuration of components of a wireless communication interface 1030, according to another embodiment, illustrating a variation to the configuration of FIG. 12. Components 1310-1340 correspond with similar components 1210-1240 of FIG. 12 and may be utilized as previously described. In FIG. 13, however, the Rx selection block 1330 is located between Rx chains 1320 and baseband signal processing block 1310. This configuration may be used, for example, where the baseband signal processing block 1310 may not be capable of processing information from all Rx chains 1320 at a time, and thus the Rx selection block 1330 and antenna control block 1340 can be used to activate antennas 1032 by passing signals from corresponding Rx chains 1320 of only the antennas 1032 for which the baseband signal processing block 1310 will process the signals.

The examples illustrated in FIGS. 12 and 13 are provided as nonlimiting examples. Other embodiments may use additional or alternative techniques for activating and deactivating antennas 1032. Such alternative techniques can include, for example powering up or down Rx chains 1320 or subcomponents of Rx chains (e.g., low noise amplifiers (LNAs)), simply ignoring or disregarding signals by the baseband signal processing block 1310, etc.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of antenna hopping for Positioning Reference Signal (PRS) measurements in positioning of a user equipment (UE) in a wireless communication network, the method comprising: executing a first measurement mode, wherein the first measurement mode comprises, for each measurement instance of a plurality of successive measurement instances, taking a set of measurements of a respective set of PRS resources during the respective measurement instance using only one subset of a plurality of subsets of antennas of the UE, such that different subsets of the plurality of subsets of the antennas of the UE are used for different measurement instances of the plurality of successive measurement instances, wherein each subset of the plurality of subsets comprises one or more antennas but fewer than all antennas of the UE; and sending one or more measurement reports from the UE to a location server, wherein each of the one or more measurement reports comprise: information indicative of a respective set of measurements, and a timestamp corresponding to the respective measurement instance during which the respective set of measurements were taken.

Clause 2. The method of clause 1, wherein sending the one or more measurement reports comprises sending a measurement report after each measurement instance.

Clause 3. The method of any of clauses 1-2 further comprising, using a first group of subsets of the plurality of subsets of the antennas to take the respective sets of measurements during a first set of the plurality of successive measurement instances.

Clause 4. The method of clause 3 further comprising, using a second group of subsets of the plurality of subsets of the antennas to take the respective sets of measurements during a second set of the plurality of successive measurement instances, wherein the second group of subsets comprises a subgroup of the first group of subsets.

Clause 5. The method of clause 4 further comprising, determining the second group of subsets based, at least in part, on measurement values of at least a portion of the respective sets of measurements taken using the first group of subsets during a first set of the plurality of successive measurement instances.

Clause 6. The method of clause 5, wherein determining the second group of subsets based, at least in part, on the measurement values comprises determining the second group of subsets based, at least in part, on: an Rx-Tx value, a Signal-to-Noise Ratio (SNR), a Reference Signal Received Power (RSRP) value, or a consistency of the measurement values, or a combination thereof.

Clause 7. The method of any of clauses 1-6, wherein the UE comprises a vehicle, the method further comprises determining the second group of subsets based, at least in part, on a location of the one or more antennas of the UE on the vehicle.

Clause 8. The method of clause 4, wherein each measurement instance of the plurality of successive measurement instances corresponds to a respective: PRS instance, PRS instance repetition, or Orthogonal frequency-division multiplexing (OFDM) symbol of a PRS instance repetition.

Clause 9. The method of any of clauses 1-8 further comprising, cycling through different subset for different measurement instances of the plurality of successive measurement instances in a round-robin fashion.

Clause 10. The method of any of clauses 1-9 further comprising, switching to the first measurement mode from a second measurement mode in which all antennas of the UE are used to take measurements in each measurement instance of another plurality of successive measurement instances.

Clause 11. The method of clause 10, wherein the switching occurs between: PRS instances, PRS instance repetitions, or OFDM symbols of a PRS instance repetition.

Clause 12. The method of any of clauses 10-11, wherein the switching to the first measurement mode from the second measurement mode is based, at least in part, on: an applicable reporting latency for the one or more measurement reports, a speed of the UE, whether one or more antennas of the UE are blocked, or an availability of one or more antennas of the UE during the plurality of successive measurement instances, or a combination thereof.

Clause 13. The method of any of clauses 10-12, wherein the UE comprises a vehicle and switching to the first measurement mode from the second measurement mode is based, at least in part, on a location of the one or more antennas of the UE on the vehicle.

Clause 14. The method of any of clauses 1-13, wherein the set of PRS resources comprise downlink PRS (DL-PRS) resources, sidelink PRS (SL-PRS) resources, or both.

Clause 15. A user equipment (UE) for antenna hopping for Positioning Reference Signal (PRS) measurements in positioning of the UE in a wireless communication network, the UE comprising: at least one transceiver; a plurality of antennas; a memory; and one or more processing units communicatively coupled with the transceiver, the plurality of antennas, and the memory, the one or more processing units configured to: execute a first measurement mode, wherein the first measurement mode comprises, for each measurement instance of a plurality of successive measurement instances, taking a set of measurements of a respective set of PRS resources during the respective measurement instance using only one subset of a plurality of subsets of the plurality of antennas of the UE, such that different subsets of the plurality of subsets of the plurality of antennas of the UE are used for different measurement instances of the plurality of successive measurement instances, wherein each subset of the plurality of subsets comprises one or more antennas of the plurality of antennas but fewer than all antennas of the plurality of antennas of the UE; and send one or more measurement reports from the UE to a location server, wherein each of the one or more measurement reports comprise: information indicative of a respective set of measurements, and a timestamp corresponding to the respective measurement instance during which the respective set of measurements were taken.

Clause 16. The UE of clause 15, wherein the one or more processing units are configured to send a measurement report after each measurement instance.

Clause 17. The UE of any of clauses 15-16, wherein the one or more processing units are further configured to use a first group of subsets of the plurality of antennas to take the respective sets of measurements during a first set of the plurality of successive measurement instances.

Clause 18. The UE of clause 17, wherein the one or more processing units are further configured to use a second group of subsets of the plurality of antennas to take the respective sets of measurements during a second set of the plurality of successive measurement instances, wherein the second group of subsets comprises a subgroup of the first group of subsets.

Clause 19. The UE of clause 18, wherein the one or more processing units are further configured to determine the second group of subsets based, at least in part, on measurement values of at least a portion of the respective sets of measurements taken using the first group of subsets during a first set of the plurality of successive measurement instances.

Clause 20. The UE of clause 19 wherein, to determine the second group of subsets based, at least in part, on the measurement values, the one or more processing units are configured to determine the second group of subsets based, at least in part, on, an Rx-Tx value, a Signal-to-Noise Ratio (SNR), a Reference Signal Received Power (RSRP) value, or a consistency of the measurement values, or a combination thereof.

Clause 21. The UE of any of clauses 15-20, wherein the UE comprises a vehicle, and wherein the one or more processing units are configured to determine the second group of subsets based, at least in part, on a location of the one or more antennas of the plurality of antennas of the UE on the vehicle.

Clause 22. The UE of any of clauses 15-21, wherein each measurement instance of the plurality of successive measurement instances corresponds to a respective: PRS instance, PRS instance repetition, or Orthogonal frequency-division multiplexing (OFDM) symbol of a PRS instance repetition.

Clause 23. The UE of any of clauses 15-22, wherein the one or more processing units are further configured to cycle through different subset for different measurement instances of the plurality of successive measurement instances in a round-robin fashion.

Clause 24. The UE of any of clauses 15-23, wherein the one or more processing units are further configured to switch to the first measurement mode from a second measurement mode in which all of the plurality of antennas of the UE are used to take measurements in each measurement instance of another plurality of successive measurement instances.

Clause 25. The UE of clause 24, wherein the one or more processing units are further configured to switch between: PRS instances, PRS instance repetitions, or OFDM symbols of a PRS instance repetition.

Clause 26. The UE of any of clauses 24-25, wherein the one or more processing units are further configured to switch to the first measurement mode from the second measurement mode based, at least in part, on: an applicable reporting latency for the one or more measurement reports, a speed of the UE, whether one or more antennas of the plurality of antennas of the UE are blocked, or an availability of one or more antennas of the plurality of antennas of the UE during the plurality of successive measurement instances, or a combination thereof.

Clause 27. The UE of any of clauses 24-26, wherein the UE comprises a vehicle and the one or more processing units are further configured to switch to the first measurement mode from the second measurement mode based, at least in part, on a location of the one or more antennas of the plurality of antennas of the UE on the vehicle.

Clause 28. The UE of any of clauses 15-27, wherein the set of PRS resources comprise downlink PRS (DL-PRS) resources, sidelink PRS (SL-PRS) resources, or both.

Clause 29. An apparatus enabling antenna hopping for Positioning Reference Signal (PRS) measurements in positioning of a user equipment (UE) in a wireless communication network, comprising: means for executing a first measurement mode, wherein the first measurement mode comprises, for each measurement instance of a plurality of successive measurement instances, taking a set of measurements of a respective set of PRS resources during the respective measurement instance using only one subset of a plurality of subsets of antennas of the UE, such that different subsets of the plurality of subsets of the antennas of the UE are used for different measurement instances of the plurality of successive measurement instances, wherein each subset of the plurality of subsets of the antennas comprises one or more antennas but fewer than all antennas of the UE; and means for sending one or more measurement reports from the UE to a location server, wherein each of the one or more measurement reports comprise: information indicative of a respective set of measurements, and a timestamp corresponding to the respective measurement instance during which the respective set of measurements were taken.

Clause 30. A non-transitory computer-readable medium storing instructions for antenna hopping for Positioning Reference Signal (PRS) measurements, the instructions comprising code for: executing a first measurement mode, wherein the first measurement mode comprises, for each measurement instance of a plurality of successive measurement instances, taking a set of measurements of a respective set of PRS resources during the respective measurement instance using only one subset of a plurality of subsets of antennas of a user equipment (UE), such that different subsets of the plurality of subsets of the antennas of the UE are used for different measurement instances of the plurality of successive measurement instances, wherein each subset of the plurality of subsets of the antennas comprises one or more antennas but fewer than all antennas of the UE; and sending one or more measurement reports from the UE to a location server, wherein each of the one or more measurement reports comprise: information indicative of a respective set of measurements, and a timestamp corresponding to the respective measurement instance during which the respective set of measurements were taken.

What is claimed is:

1. A method of antenna hopping for Positioning Reference Signal (PRS) measurements in positioning of a user equipment (UE) in a wireless communication network, the method comprising:

executing a first measurement mode, wherein the first measurement mode comprises, for each measurement instance of a plurality of successive measurement instances, taking a set of measurements of a respective set of PRS resources during the respective measurement instance using only one subset of a plurality of subsets of antennas of the UE, such that different subsets of the plurality of subsets of the antennas of the UE are used for different measurement instances of the plurality of successive measurement instances, wherein each subset of the plurality of subsets comprises one or more antennas but fewer than all antennas of the UE; and sending one or more measurement reports from the UE to a location server, wherein each of the one or more measurement reports comprise:

information indicative of a respective set of measurements, and a timestamp corresponding to the respective measurement instance during which the respective set of measurements were taken.

2. The method of claim 1, wherein sending the one or more measurement reports comprises sending a measurement report after each measurement instance.

3. The method of claim 1, further comprising using a first group of subsets of the plurality of subsets of the antennas to take the respective sets of measurements during a first set of the plurality of successive measurement instances.

4. The method of claim 3, further comprising using a second group of subsets of the plurality of subsets of the antennas to take the respective sets of measurements during a second set of the plurality of successive measurement instances, wherein the second group of subsets comprises a subgroup of the first group of subsets.

5. The method of claim 4, further comprising determining the second group of subsets based, at least in part, on measurement values of at least a portion of the respective sets of measurements taken using the first group of subsets during a first set of the plurality of successive measurement instances.

6. The method of claim 5, wherein determining the second group of subsets based, at least in part, on the measurement values comprises determining the second group of subsets based, at least in part, on:
an Rx-Tx value,
a Signal-to-Noise Ratio (SNR),
a Reference Signal Received Power (RSRP) value, or
a consistency of the measurement values, or
a combination thereof.

7. The method of claim 4, wherein the UE comprises a vehicle, the method further comprises determining the second group of subsets based, at least in part, on a location of the one or more antennas of the UE on the vehicle.

8. The method of claim 1, wherein each measurement instance of the plurality of successive measurement instances corresponds to a respective:
PRS instance,
PRS instance repetition, or
Orthogonal frequency-division multiplexing (OFDM) symbol of a PRS instance repetition.

9. The method of claim 1, further comprising cycling through different subset for different measurement instances of the plurality of successive measurement instances in a round-robin fashion.

10. The method of claim 1, further comprising switching to the first measurement mode from a second measurement mode in which all antennas of the UE are used to take measurements in each measurement instance of another plurality of successive measurement instances.

11. The method of claim 10, wherein the switching occurs between:
PRS instances,
PRS instance repetitions, or
OFDM symbols of a PRS instance repetition.

12. The method of claim 10, wherein the switching to the first measurement mode from the second measurement mode is based, at least in part, on:
an applicable reporting latency for the one or more measurement reports,
a speed of the UE,
whether one or more antennas of the UE are blocked, or
an availability of one or more antennas of the UE during the plurality of successive measurement instances, or
a combination thereof.

13. The method of claim 10, wherein the UE comprises a vehicle and switching to the first measurement mode from the second measurement mode is based, at least in part, on a location of the one or more antennas of the UE on the vehicle.

14. The method of claim 1, wherein the set of PRS resources comprise downlink PRS (DL-PRS) resources, sidelink PRS (SL-PRS) resources, or both.

15. A user equipment (UE) for antenna hopping for Positioning Reference Signal (PRS) measurements in positioning of the UE in a wireless communication network, the UE comprising:
at least one transceiver;
a plurality of antennas;
a memory; and
one or more processing units communicatively coupled with the transceiver, the plurality of antennas, and the memory, the one or more processing units configured to:
execute a first measurement mode, wherein the first measurement mode comprises, for each measurement instance of a plurality of successive measurement instances, taking a set of measurements of a respective set of PRS resources during the respective measurement instance using only one subset of a plurality of subsets of the plurality of antennas of the UE, such that different subsets of the plurality of subsets of the plurality of antennas of the UE are used for different measurement instances of the plurality of successive measurement instances, wherein each subset of the plurality of subsets comprises one or more antennas of the plurality of antennas but fewer than all antennas of the plurality of antennas of the UE; and
send one or more measurement reports from the UE to a location server, wherein each of the one or more measurement reports comprise:
information indicative of a respective set of measurements, and
a timestamp corresponding to the respective measurement instance during which the respective set of measurements were taken.

16. The UE of claim 15, wherein the one or more processing units are configured to send a measurement report after each measurement instance.

17. The UE of claim 15, wherein the one or more processing units are further configured to use a first group of subsets of the plurality of antennas to take the respective sets of measurements during a first set of the plurality of successive measurement instances.

18. The UE of claim 17, wherein the one or more processing units are further configured to use a second group of subsets of the plurality of antennas to take the respective sets of measurements during a second set of the plurality of successive measurement instances, wherein the second group of subsets comprises a subgroup of the first group of subsets.

19. The UE of claim 18, wherein the one or more processing units are further configured to determine the second group of subsets based, at least in part, on measurement values of at least a portion of the respective sets of measurements taken using the first group of subsets during a first set of the plurality of successive measurement instances.

20. The UE of claim 19, wherein, to determine the second group of subsets based, at least in part, on the measurement values, the one or more processing units are configured to determine the second group of subsets based, at least in part, on:
an Rx-Tx value,
a Signal-to-Noise Ratio (SNR),
a Reference Signal Received Power (RSRP) value, or
a consistency of the measurement values, or
a combination thereof.

21. The UE of claim 18, wherein the UE comprises a vehicle, and wherein the one or more processing units are configured to determine the second group of subsets based, at least in part, on a location of the one or more antennas of the plurality of antennas of the UE on the vehicle.

22. The UE of claim 15, wherein each measurement instance of the plurality of successive measurement instances corresponds to a respective:

PRS instance,

PRS instance repetition, or

Orthogonal frequency-division multiplexing (OFDM) symbol of a PRS instance repetition.

23. The UE of claim 15, wherein the one or more processing units are further configured to cycle through different subset for different measurement instances of the plurality of successive measurement instances in a round-robin fashion.

24. The UE of claim 15, wherein the one or more processing units are further configured to switch to the first measurement mode from a second measurement mode in which all of the plurality of antennas of the UE are used to take measurements in each measurement instance of another plurality of successive measurement instances.

25. The UE of claim 24, wherein the one or more processing units are further configured to switch between:

PRS instances,

PRS instance repetitions, or

OFDM symbols of a PRS instance repetition.

26. The UE of claim 24, wherein the one or more processing units are further configured to switch to the first measurement mode from the second measurement mode based, at least in part, on:

an applicable reporting latency for the one or more measurement reports, a speed of the UE, whether one or more antennas of the plurality of antennas of the UE are blocked, or an availability of one or more antennas of the plurality of antennas of the UE during the plurality of successive measurement instances, or a combination thereof.

27. The UE of claim 24, wherein the UE comprises a vehicle and the one or more processing units are further configured to switch to the first measurement mode from the second measurement mode based, at least in part, on a location of the one or more antennas of the plurality of antennas of the UE on the vehicle.

28. The UE of claim 15, wherein the set of PRS resources comprise downlink PRS (DL-PRS) resources, sidelink PRS (SL-PRS) resources, or both.

29. An apparatus enabling antenna hopping for Positioning Reference Signal (PRS) measurements in positioning of a user equipment (UE) in a wireless communication network, comprising:

means for executing a first measurement mode, wherein the first measurement mode comprises, for each measurement instance of a plurality of successive measurement instances, taking a set of measurements of a respective set of PRS resources during the respective measurement instance using only one subset of a plurality of subsets of antennas of the UE, such that different subsets of the plurality of subsets of the antennas of the UE are used for different measurement instances of the plurality of successive measurement instances, wherein each subset of the plurality of subsets of the antennas comprises one or more antennas but fewer than all antennas of the UE; and means for sending one or more measurement reports from the UE to a location server, wherein each of the one or more measurement reports comprise:

information indicative of a respective set of measurements, and a timestamp corresponding to the respective measurement instance during which the respective set of measurements were taken.

30. A non-transitory computer-readable medium storing instructions for antenna hopping for Positioning Reference Signal (PRS) measurements, the instructions comprising code for:

executing a first measurement mode, wherein the first measurement mode comprises, for each measurement instance of a plurality of successive measurement instances, taking a set of measurements of a respective set of PRS resources during the respective measurement instance using only one subset of a plurality of subsets of antennas of a user equipment (UE), such that different subsets of the plurality of subsets of the antennas of the UE are used for different measurement instances of the plurality of successive measurement instances, wherein each subset of the plurality of subsets of the antennas comprises one or more antennas but fewer than all antennas of the UE; and sending one or more measurement reports from the UE to a location server, wherein each of the one or more measurement reports comprise:

information indicative of a respective set of measurements, and a timestamp corresponding to the respective measurement instance during which the respective set of measurements were taken.

* * * * *